United States Patent

Mills et al.

[11] Patent Number: 5,536,938
[45] Date of Patent: Jul. 16, 1996

[54] PULSED NEUTRON DECAY LOGGING

[75] Inventors: William R. Mills, Plano; L. Scott Allen, Dallas, both of Tex.

[73] Assignee: Mobil Oil Corporation, Fairfax, Va.

[21] Appl. No.: 391,852

[22] Filed: Feb. 22, 1995

[51] Int. Cl.$^6$ .................................................. G01V 5/10
[52] U.S. Cl. .................. 250/269.4; 250/264; 250/269.5; 364/422; 395/929
[58] Field of Search .................................. 250/262, 264, 250/269.4, 269.5; 364/422; 378/901; 395/929

[56] References Cited

U.S. PATENT DOCUMENTS

| | | | |
|---|---|---|---|
| 3,719,827 | 3/1973 | Dennis | 250/84.5 |
| 3,984,694 | 10/1976 | Dennis | 250/502 |
| 4,298,805 | 11/1981 | Dennis | 376/111 |
| 4,409,481 | 11/1983 | Smith et al. | 250/270 |
| 4,581,532 | 4/1986 | Givens et al. | 250/266 |
| 4,926,044 | 5/1990 | Wraight | 250/264 |
| 5,068,531 | 11/1991 | Allen et al. | 250/269 |
| 5,251,286 | 10/1993 | Wiener et al. | 395/22 |
| 5,300,770 | 4/1994 | Allen et al. | 250/269 |
| 5,345,077 | 9/1994 | Allen et al. | 250/264 |

*Primary Examiner*—David P. Porta
*Assistant Examiner*—David Vernon Bruce
*Attorney, Agent, or Firm*—Ronald A. Bleeker; Malcolm D. Keen

[57] ABSTRACT

A borehole logging tool having a pair of spaced-apart detectors records intensity signals representing the die-away of nuclear radiation in a subsurface formation. Weighted moments of the intensity signals as well as of a model are produced. Corresponding weighted intensity and model moments are equated and simultaneously solved to obtain values for a borehole decay constant, a formation decay constant, and a formation-to-borehole amplitude ratio for each of the pair of detectors. From these values a trained neural network produces intrinsic values of a formation macroscopic thermal neutron absorption cross section, a formation porosity, and a borehole fluid cross section. A log is generated of these intrinsic values versus depth as the logging tool traverses the borehole.

8 Claims, 5 Drawing Sheets

PULSED NEUTRON DECAY LOGGING

BACKGROUND OF THE INVENTION

In pulsed neutron decay logging, a logging tool contains a small neutron generator capable of being turned on and off in a controlled manner to produce bursts of high-energy neutrons, one or more radiation detectors to detect secondary radiation resulting from nuclear interactions between the neutrons emitted from the generator and nuclei comprising the materials in the borehole region and the formation, circuitry to record the detection times relative to a time reference related to the neutron production bursts, downhole and uphole circuitry to control operation of the tool, and means (generally uphole) to process the spectrum of detection times (commonly called the die-away or decay spectrum) to estimate earth formation properties useful in the evaluation of oil and gas reservoirs. The logging tool is passed through a borehole (uncased or cased and with or without tubing depending on the application), measurements are made as a function of depth, and a log of the results of the data processing is recorded as a function of depth.

The detector system can be designed to detect gamma rays resulting from capture of thermal neutrons produced as a result of slowing down and thermalization of the high-energy source neutrons or the thermal neutrons themselves. Since most commercial pulsed neutron decay systems presently in use are based on pulsed neutron capture measurements, the following background discussion will be focused on such measurements.

Two references providing background information on pulsed neutron capture logging are U.S. Pat. No. 4,409,481 to Smith, Jr. et al., and U.S. Pat. No. 4,926,044 to Wraight. These references, taken together, give a balanced view of the history of developments in pulsed neutron capture logging. Some of the highlights are discussed below.

Initially, the decay process was modeled by the simple expression:

$$N(t) = N_o e^{-t/\tau}, \tag{1}$$

where $N_o$ is the measured capture gamma-ray intensity in a single detector at time 0, $N(t)$ is the intensity at time $t$, and $\tau$ is the mean lifetime of thermal neutrons in the formation. Counting rates $N_1$ and $N_2$ were measured in two time gates of equal duration beginning at times $t_1$ and $t_2$, and $\tau$ was determined from the expression:

$$\tau = \frac{t_2 - t_1}{\ln(N_1/N_2)} \tag{2}$$

The times $t_1$ and $t_2$ were assumed to be set sufficiently long after the end of the neutron burst that any early deviations from single-exponential decay were negligible for the counting gates. It was also assumed that the intrinsic (i.e., true) formation capture cross section could be obtained from the relation:

$$\Sigma = \frac{1}{v\tau}, \tag{3}$$

where $v$ is the average thermal neutron speed.

As time went on, experience began to show that there were two significant problems arising from the simple approach described above:

i) the single-exponential model is not an adequate practical representation of the die-away of capture gamma rays in the borehole environment; and ii) the true formation capture cross section cannot generally be obtained as simply as the relation above.

The first problem was addressed by using a two-exponential model:

$$N(t) = N_b e^{-t/\tau_b} + N_f e^{-t/\tau_f} \tag{4}$$

Measurements were made of essentially all of the statistically meaningful die-away data and they were fit to the above expression to obtain $\tau_b$ and $\tau_f$. The shorter of the two lifetimes (assumed here to be $\tau_b$) was taken to be characteristic of the borehole materials, while the longer one ($\tau_f$) characterized the formation. The second problem was addressed by recognizing that $\tau$ (for a single-exponential model), $\tau_b$, and $\tau_f$ were dependent on effects of thermal neutron diffusion. Therefore, one could write $$\Sigma_b = \frac{1}{v\tau_b} \text{ and} \tag{5}$$

$$\Sigma_f = \frac{1}{v\tau_f} \tag{6}$$

and develop empirical diffusion corrections to be applied to $\Sigma_b$ and $\Sigma_f$ to obtain the intrinsic cross sections. An additional correction that must be applied is based on the fact that, because of diffusion, the values of $\tau_b$ and $\tau_f$ are not independent of each other. Thus, even if the borehole and formation have the same diffusion properties, a correction is needed to obtain the intrinsic values of borehole and formation capture cross sections.

There are practical difficulties in determining the parameters of a two-exponential model from the observed data. Least-squares fitting has been used, but unless it is modified in some way it is very slow computationally for application in the field where it is desirable to analyze the data in real time. Successive stripping has been proposed, wherein the two decay components are separately estimated and are alternately stripped mathematically from the observed data, followed by reestimation and stripping until some convergence criterion is satisfied. A combination of successive stripping and least-squares fitting has been used successfully by Halliburton (see the aforementioned U.S. Pat. No. 4,409,481).

Schlumberger has proposed and implemented a method to build diffusion effects into the die-away model based on a modification of the two-exponential model:

$$N(t) = N_b t^{-\gamma_b} e^{-t/\tau_b} + N_f t^{-\gamma_f} e^{-t/\tau_f} \tag{b 7}$$

A reference to D. K. Steinman, et al., "Dual-Burst Thermal Decay Time Logging Principles", *SPE Formation Evaluation*, vol. 3, no. 2, pp. 377–385, June 1988. The factors $t^{-\gamma_b}$ and $t^{-\gamma_f}$, where $\gamma_b$ and $\gamma_f$ are empirically determined, are claimed to account for diffusion effects. Recent comparative studies by Shell indicate that there is little, if any, significant improvement to be gained in determining intrinsic cross sections by using the above diffusion-modified decay model (F. G. van den Berg, "The Capability of Pulsed Neutron Capture Logging to Determine Oil and Gas Saturations", SPE Paper 19614, 64th Annual Technical Conference and Exhibition of SPE, San Antonio, October 1989; and R. J. M. Bonnie, "Evaluation of Various Pulsed Neutron Capture Logging Tools Under Well-Defined Laboratory Conditions", *The Log Analyst*, vol. 35, no. 2, pp. 46–51, March–April 1994).

The objects of the present invention are to (i) provide novel means for estimating model parameters from observed die-away data in a numerically stable and computationally efficient manner; (ii) provide novel means for obtaining intrinsic values of the macroscopic thermal neutron absorption cross section of the formation and the materials in the borehole region; and (iii) provide novel means for determining formation hydrogen index, from which porosity may be estimated, based on the parameters characterizing a two-exponential decay model.

SUMMARY OF THE INVENTION

The present invention is directed to a method for converting signals representing the die-away of nuclear radiation in a subsurface formation surrounding a borehole into a log of certain intrinsic formation properties versus depth within the formation.

A logging tool having a pulsed source of fast neutrons and a pair of near and far spaced-apart detectors of secondary nuclear radiation is lowered into a borehole traversing a subsurface formation where intrinsic properties are to be determined. The subsurface formation is irradiated at an initial depth position within the borehole with fast neutrons from the neutron source. Intensity signals representing the die-away of secondary nuclear radiation are recorded with the near and far spaced-apart nuclear detectors after fast neutrons from the neutron source have been transported throughout the formation and borehole materials in the neighborhood of the tool, such transport being accompanied by slowing down and ultimate capture of thermalized neutrons. The secondary radiation may consist of capture gamma rays or thermal neutrons. A model is generated of the die-away of nuclear radiation in a subsurface formation having amplitudes and decay constants characteristic of exponentially varying intensity in response to borehole and formation effects. Weighted moments are produced of the model and of the intensity signals from the near and far detectors. Corresponding model and intensity weighted moments are equated and the resulting equations simultaneously solved to obtain values for a borehole decay constant, a formation decay constant, and a formation-to-borehole borehole amplitude ratio for each of the near and far detectors. Intrinsic values are produced of a formation macroscopic thermal neutron absorption cross section, a formation porosity, and a borehole fluid cross section from the borehole decay constant, the formation decay constant and the formation-to-borehole amplitude ratio for each of the near and far detectors using a trained neural network.

The borehole logging tool is traversed along the borehole from the initial depth position and the above described logging method is repeated for a plurality of depth positions along the borehole. A log is generated of the determined intrinsic values of formation macroscopic thermal neutron absorption cross section, the formation porosity and the borehole fluid cross section versus depth within the subsurface formation.

THE DATA GENERATION PROCESS

Figure 1:
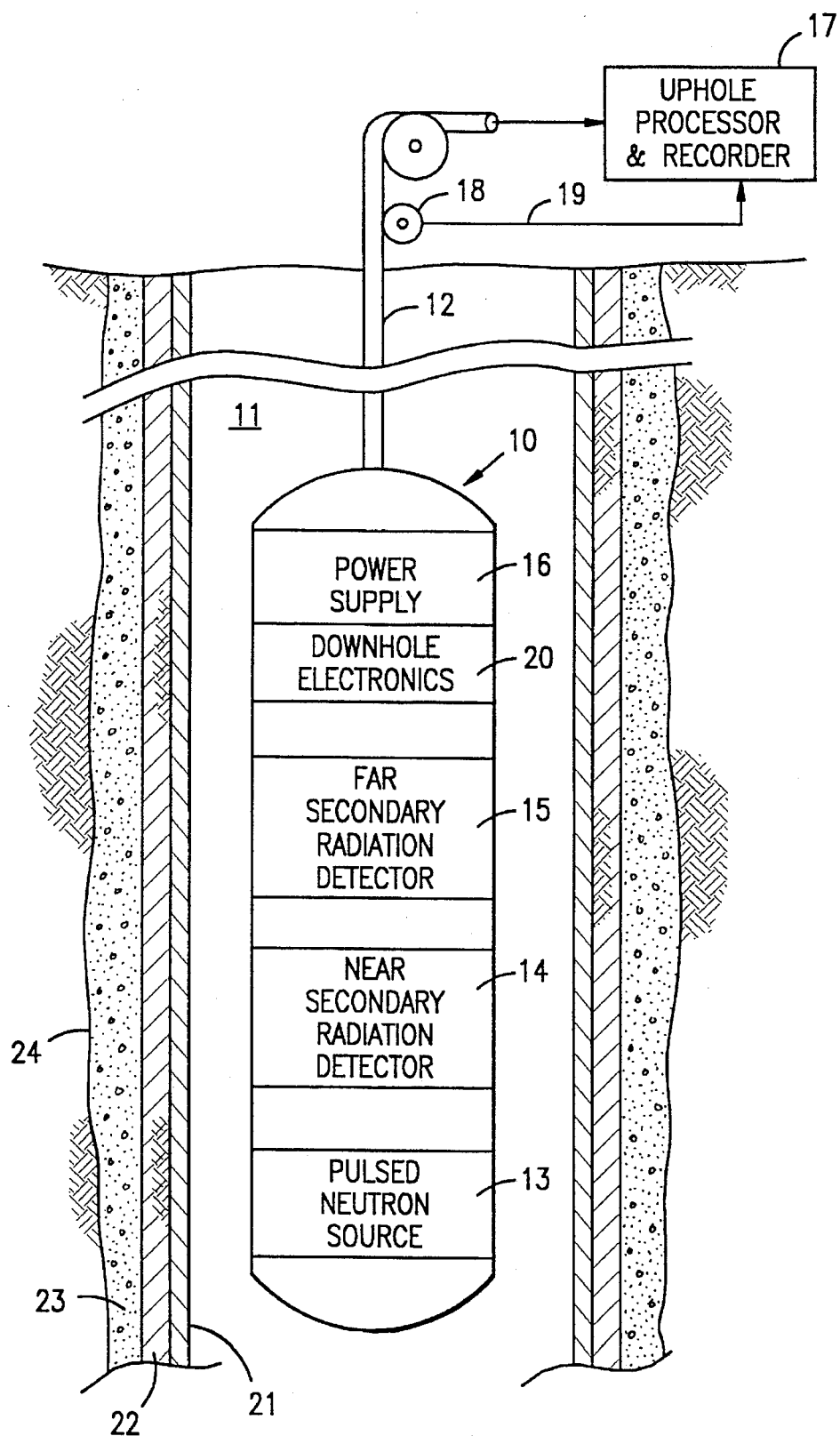
FIG. 1 illustrates a dual-detector, pulsed neutron logging tool useful in carrying out the pulsed neutron decay logging method of the present invention.

Data are generated in pulsed neutron decay logging as follows:

(i) Use N discrete time channels, not necessarily contiguous or of equal duration, (ii) Accumulate counts in the time channels over a selected counting time (based on either an elapsed time or a distance traveled by the logging tool).

(iii) Then, $C_n$=accumulated counts in channel n for n=1 through N channels.

The n'th time channel is defined by the pair of numbers $(t_n, t_n+\Delta t_n)$, where $t_n$ is the beginning time of the channel and $t_n+\Delta t_n$ is the ending time.

Mathematically, the data may be described as the set $\{C_n$ in $(t_n, t_n+\Delta t_n); n=1, N\}$.

MATHEMATICAL MODEL OF THE DATA GENERATION PROCESS

The data are generated from a physical model which may be represented conveniently by the sum of M exponential terms.

For the build-up phase (while the neutron burst is on), the intensity Y(t) may be represented by $$Y(t) = \sum_{m=1}^{M} B_m(1 - e^{-\lambda_m t}), \tag{8}$$

assuming the neutron generator output is constant during the burst.

For the die-away phase (after the neutron burst is over), $$Y(t) = \sum_{m=1}^{M} A_m e^{-\lambda_m t}. \tag{9}$$

If the build-up phase results in a saturation of all the exponential components, then $A_m=B_m$ for all M values.

The above expressions are based on the assumption that successive bursts of neutrons from the pulsed neutron generator in the logging tool are sufficiently far apart in time (i.e., the repetition frequency is low enough) relative to all the decay constants, $\lambda_m$, that residual "holdover" of counts from previous cycles is negligible. If this assumption is not satisfied, the expressions may be modified as follows:

$$Y(t) = \sum_{m=1}^{M} B_m \left( \frac{1-e^{-\lambda_m t}}{1-e^{-\lambda_m T}} \right) ; \text{build-up} \tag{10}$$

$$Y(t) = \sum_{m=1}^{M} \frac{A_m e^{-\lambda_m t}}{1-e^{-\lambda_m T}} ; \text{die-away} \tag{11}$$

T is the period, or cycle time, between successive bursts.

From here on the die-away phase will be emphasized, but it is to be understood that the method may be applied equally well to the build-up phase. Also to be emphasized is the case where residual holdover may be neglected.

The mathematical model which conforms to the data generation process is as follows:

$$Y_n = \int_{t_n}^{t_n+\Delta t_n} Y(t) \, dt \tag{12}$$

$$= \sum_{m=1}^{M} A_m \int_{t_n}^{t_n+\Delta t_n} e^{-\lambda_m t} \, dt \tag{13}$$

-continued $$= \sum_{m=1}^{M} \frac{A_m}{\lambda_m} (1 - e^{-\lambda_m \Delta t_n}) e^{-\lambda_m t_n} \quad (14)$$

A useful alternative data set and associated model are obtained if the channel counts are normalized by dividing them by the channel duration. We define $$C_n' = \frac{C_n}{\Delta t_n} \; ; n = 1, N \quad (15)$$

The corresponding model is $$Y_n' = \frac{1}{\Delta t_n} \int_{t_n}^{t_n + \Delta t_n} Y(t) \, dt \quad (16)$$

$$= \sum_{m=1}^{M} \frac{A_m}{\lambda_m \Delta t_n} (1 - e^{-\lambda_m \Delta t_n}) e^{-\lambda_m t_n} \quad (17)$$

A special case arises if the time channels are contiguous and of equal duration, $\Delta t$. Then, if the zero time reference is chosen to be the beginning of channel 1, $$t_n = (n-1)\Delta t; \; n=1, N. \quad (18)$$

The data (unnormalized) may be described as the set $\{C_n$ in $(t_n, t_n + \Delta t); n=1, N\}$, and the corresponding model is $$Y_n = \sum_{m=1}^{M} \frac{A_m}{\lambda_m} (1 - e^{\lambda_m \Delta t}) e^{-\lambda_m(n-1)\Delta t} \quad (19)$$

APPLICATION OF WEIGHTED MOMENTS METHOD

The method of weighted moments consists of choosing 2M weighting functions and 2M associated summation intervals over time channels, calculating 2M weighted moments of time or intensity from the data, calculating the same weighted moments from the model, equating corresponding data and model moments, and solving the resulting equations for the amplitudes ($A_m$) and decay constants ($\lambda_m$) of the model. Mathematically, the weighting functions and summation intervals can be represented as two sets:

2M weighting functions $\{w_{kn}; k=1,2M; n=1, N\}$ 2M summation intervals $\{(l_k, u_k); k=1,2M\}$ Each weighting function is defined overall time channels. The quantities $l_k$ and $u_k$ are the lower and upper limits, respectively, of the k'th summation interval and must be integers. Clearly, the counts must be available over the entire summation interval.

The following quantities are defined:

$\bar{t}_D$ = weighted time moment of the data, $\bar{t}_M$ = weighted time moment of the model, $\bar{C}$ = weighted intensity moment of the data, and $\bar{Y}$ = weighted intensity moment of the model, In what follows, a special notation of the following form is used:

$$\begin{bmatrix} a \\ b \end{bmatrix}. \quad (20)$$

Such quantities appear in equations involving weighted moments. The notation is to be understood to mean that either the upper or lower component is chosen in a consistent way across an equals sign.

Form the weighted data moments:

$$\begin{bmatrix} \bar{t}_D \\ \bar{C} \end{bmatrix}_k = \sum_{n=l_k}^{u_k} W_{kn} \begin{bmatrix} t_n \\ 1 \end{bmatrix} C_n / \sum_{n=l_k}^{u_k} W_{kn} \begin{bmatrix} C_n \\ 1 \end{bmatrix}; \quad (21)$$

$k = 1, 2M$

Form the weighted model moments:

$$\begin{bmatrix} \bar{t}_M \\ \bar{Y} \end{bmatrix}_k = \sum_{n=l_k}^{u_k} W_{kn} \begin{bmatrix} t_n \\ 1 \end{bmatrix} Y_n / \sum_{n=l_k}^{u_k} W_{kn} \begin{bmatrix} Y_n \\ 1 \end{bmatrix}; \quad (22)$$

$k = 1, 2M$

Equate corresponding moments:

$$\begin{bmatrix} \bar{t}_D \\ \bar{C} \end{bmatrix}_k = \begin{bmatrix} \bar{t}_M \\ \bar{Y} \end{bmatrix}_k; \quad (23)$$

$k = 1, 2M$

Solve the above 2M simultaneous equations for $A_m$, $\lambda_m$ for m=1, M. These equations may be solved by any one of several numerical techniques capable of providing a solution. Such techniques are discussed, for example, in *Numerical Recipes* (second edition) by Press, Teukolsky, Vetterling, and Flannery; 1992; Cambridge University Press (see chapter 9, "Root Finding and Nonlinear Sets of Equations").

APPLICATION TO A SPECIFIC TOOL CONFIGURATION

Referring to FIG. 1, there will firstly be described a borehole logging tool with which the pulsed neutron decay logging method of the present invention may be carried out. A borehole logging tool 10 is supported within the borehole 11 by cable 12. Housed within tool 10 near its lower end is a high energy pulsed neutron source 13. Located at spaced-apart positions above pulsed neutron source 13 are a near secondary radiation detector 14, a far secondary radiation detector 15, a power supply 16, and a downhole electronics section 20. Cable 12 carries information and control signals to an uphole processor and recorder 17. As the tool 10 is moved through the borehole 11, a depth recording means such as a measuring sheave 18 produces a depth signal which is applied to uphole processor and recorder 17 by way of line 19 thus correlating the downhole measurements with the depths at which they were taken.

Neutron source 13 may be any suitable pulsed fast neutron source but preferably will take the form of a D-T accelerator comprising an ion source of deuterium and a target of tritium. Trigger pulses are periodically applied to the deuterium source in order to ionize the deuterium. The deuterium ions thus produced are accelerated to the target by a high negative voltage and the resulting reaction between the deuterium ions and the tritium produces bursts of neutrons having an energy of about 14 Mev. The neutron bursts will be of a duration typically between about 20 to 100 microseconds with an interval between bursts of about 800 to 2500 microseconds to provide a pulse repetition rate of 400 to 1250 fast neutron bursts per second. One such acceptable neutron source is manufactured by Halliburton of Fort Worth, Tex.

Secondary radiation detectors 14 and 15 may be of any suitable type which optimizes the detection of secondary radiation consisting of capture gamma rays or thermal neutrons.

In FIG. 1 the logging tool 10 is shown centralized within the borehole 11. If the secondary radiation detectors 14 and 15 are gamma-ray detectors, the radial positions of the detectors and the logging tool within the borehole do not have a major influence on the die-away rates of thermal neutron capture gamma rays measured by the detectors. In this case the detectors are customarily located coaxially with the tool axis and the tool is allowed to assume its position freely in the borehole. On the other hand, if the secondary radiation detectors are thermal neutron detectors, it may be highly desirable to employ mechanical means to both place the detectors as near to the borehole wall as possible and to shield the detectors from thermal neutrons which arrive from the opposite, or "backside", of the borehole. Such mechanical means may be achieved by using a suitable device to force the entire tool to be in contact with the borehole wall, or to locate the detectors in a separate housing or pad which may be positioned against the borehole wall. Backshielding of the detectors and positioning of the tool against the borehole wall are described in U.S. Pat. No. 4,581,532 to Givens and Mills, the teaching of which is incorporated herein by reference. Location of the detectors in a separate housing which is positioned against the borehole wall is described for the simpler case of a single detector in U.S. Pat. No. 5,068,531 to Allen et al. and in U.S. Pat. No. 5,300,770 to Allen and Mills, the teachings of which are incorporated herein by reference.

The power supply 16 is provided for the pulsed neutron source 13 and the downhole electronics 20. Acceptable power supplies suitable for use with a D-T pulsed neutron source assumed are described in U.S. Pat. Nos. 3,719,827; 3,984,694; and 4,298,825 to Dennis.

In FIG. 1, the logging tool is shown inside tubing 21 which is inside casing 22 that has been cemented into place at 23 in a borehole 24. It is to be understood that circumstances may arise when the tool is run inside the casing, the tubing being absent. It is also to be understood that the tool may be run in an open hole with tubing, casing, and cement all being absent.

APPLICATION TO A SPECIFIC DATA ANALYSIS MODEL

Figure 2:
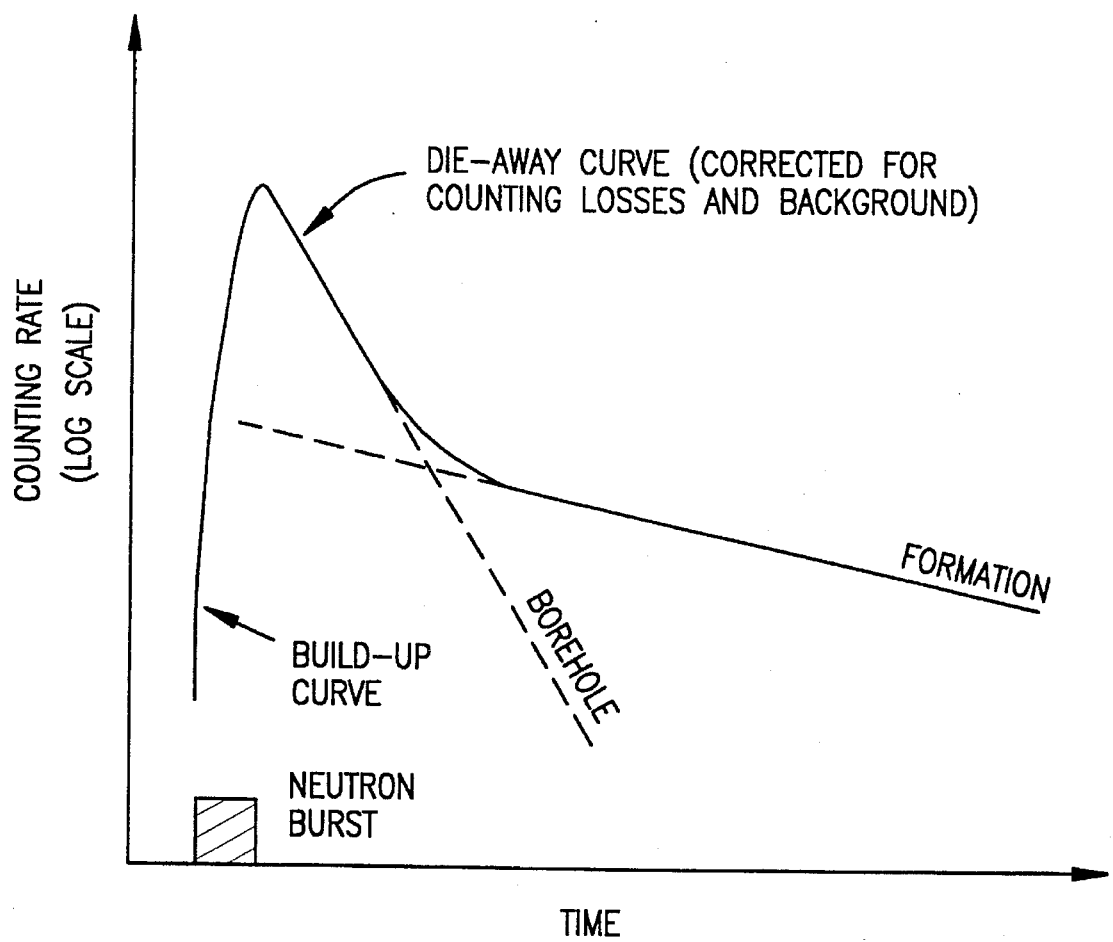
FIG. 2 illustrates a nuclear die-away curve as might be recorded by the borehole logging system of FIG. 1.

FIG. 2 shows a typical die-away curve, smoothed through the data points, obtained from either the near detector 14 or far detector 15. Due primarily to neutron transport effects, the curves will not necessarily have identical shapes, although their general features will be similar. In FIG. 2, the early build-up portion of the curve is shown, followed by the die-away portion. Such curves are generally plotted semi-logarithmically, counting rate being plotted logarithmically along the ordinate and time being plotted linearly along the abscissa. In the simpler realistic interpretation of the die-away portion of the curve, it is convenient to regard the die-away as the sum of two exponential components, one dependent primarily on the properties of the borehole region and one dependent primarily on the properties of the formation. For convenience we denote these two components, respectively, with subscripts 1 and 2 attached to the corresponding amplitudes and decay constants. Thus, for this simple case the die-away curve can be represented generally as:

$$Y(t) = A_1 e^{-\lambda_1 t} + A_2 e^{-\lambda_2 t} \tag{24}$$

In FIG. 2 the components are labelled "borehole" and "formation" and are shown graphically as straight lines on the semi-logarithmic plot.

The mathematical representation above is only a convenience based on empirical considerations; strictly speaking, there is no compelling theoretical basis for this representation. Furthermore, it may be deemed desirable to add a third exponential term to the model so that a near-borehole region, an intermediate-borehole region, and the formation may be represented separately. It also may be deemed desirable to modify the exponential terms to incorporate mathematical forms which attempt to account for neutron diffusion effects. The foregoing additions and modifications are regarded as being within the scope of the present invention.

The weighted-moments method described previously will now be applied to the case depicted in FIG. 2. It is assumed that N contiguous time channels of equal duration $\Delta t$ are used to accumulate the data over a preselected time increment or logging tool depth increment. It is recalled that the data may be described by the set $\{C_n \text{ in } (t_n, t_n+\Delta t); i=1,N\}$, and the model, assumed to be the sum of two exponentials, is:

$$Y_n = A_1 \left( \frac{1-e^{-\lambda_1 \Delta t}}{\lambda_1} \right) e^{-\lambda_1 \Delta t(n-1)} + A_2 \left( \frac{1-e^{-\lambda_2 \Delta t}}{\lambda_1} \right) e^{-\lambda_2 \Delta t(n-1)} \tag{25}$$

For convenience the following definitions will apply:

$$\mu_1 = \lambda_1 \Delta t, \tag{26}$$

$$\mu_2 = \lambda_2 \Delta t, \tag{27}$$

$$R_1 = \frac{1-e^{-\lambda_1 \Delta t}}{\lambda_1} \tag{28}$$

$$R_2 = \frac{1-e^{-\lambda_2 \Delta t}}{\lambda_2} \tag{29}$$

Then the model may be written as:

$$Y_n = A_1 R_1 e^{-\mu_1(n-1)} + A_2 R_2 e^{-\mu_2(n-1)} \tag{30}$$

In pulsed neutron decay logging, one is rarely interested in absolute intensities of counting rates, since, among other things, they depend on the output of the neutron generator which is not accurately known as a rule. For this reason, it is convenient to carry out a normalization which eliminates an dependence on absolute intensities. This can be done in several ways. For this specific case the data are normalized by dividing the counts in each channel by the counts in channel 1. Thus, the normalized counts are defined as:

$$C_n^* = C_n/C_1 \quad n=1, N. \tag{31}$$

The normalized model becomes:

$$Y_n^* = Y_n/Y_1 \tag{32}$$

$$= \frac{A_1 R_1 e^{-\mu_1(n-1)} + A_2 R_2 e^{-\mu_2(n-1)}}{A_1 R_1 + A_2 R_2} \tag{33}$$

$$= \frac{e^{-\mu_1(n-1)} + \frac{A_2 R_2}{A_1 R_1} e^{-\mu_2(n-1)}}{1 + \frac{A_2 R_2}{A_1 R_1}} \tag{34}$$

Defining $$R = \frac{A_2 R_2}{A_1 R_1},$$

the model becomes:

$$Y_n^* = \frac{e^{-\mu_1(n-1)} + R e^{-\mu_2(n-1)}}{1+R} ; \tag{36}$$

-continued $n = 1, N.$

The formation-to-borehole ratio R has been used in the above equation. For a two-exponential decay model, it is to be understood that the borehole-to-formation ratio could just as well be used with suitable alteration of definitions and equations.

With the above model there are three parameters to be determined from the data for each detector: $\mu_1$, $\mu_2$, and R. As described hereinbefore, this is done preferably by choosing three weighting functions and three associated intervals; forming three weighted time moments, intensity moments, or a mix of three time and intensity moments of the normalized data and the normalized model; equating corresponding data and model moments; and solving simultaneously the resulting three equations for $\mu_1$, $\mu_2$, and R. Since data are obtained from both the near and far detectors, the weighted-moments analysis can be carried out independently on each detector data set to give six independent parameters which are denoted as $\mu_{1N}$, $\mu_{2N}$, $R_N$, $\mu_{1F}$, $\mu_{2F}$, and $R_F$, where the subscripts N and F refer to the near and far detector, respectively.

In a preferred embodiment of this invention the six model parameters determined from the data are used as inputs to a previously trained neural network, or combination of neural networks, to produce an output consisting of values of the physical properties of the formation and the borehole region needed for formation evaluation. In addition to the model parameters, the neural networks generally have certain ancillary information as input which, in effect, adjusts the networks to correspond to one of a set of prior training conditions which matches the conditions existing in the well being logged. Alternatively, in order to minimize errors in the final output variables, it may be desirable to develop and use an entire library of neural networks, each trained to optimally process a specific case of the ancillary information.

In regard to the use of neural networks in this application, it should be pointed out that a mathematical property of such networks is that they provide very accurate means for relating sets of input and output data. The precision with which input and output data can be related obviously depends on the quality and quantity of training data, regardless of whether neural networks or analytical approximations are used.

Figure 3:
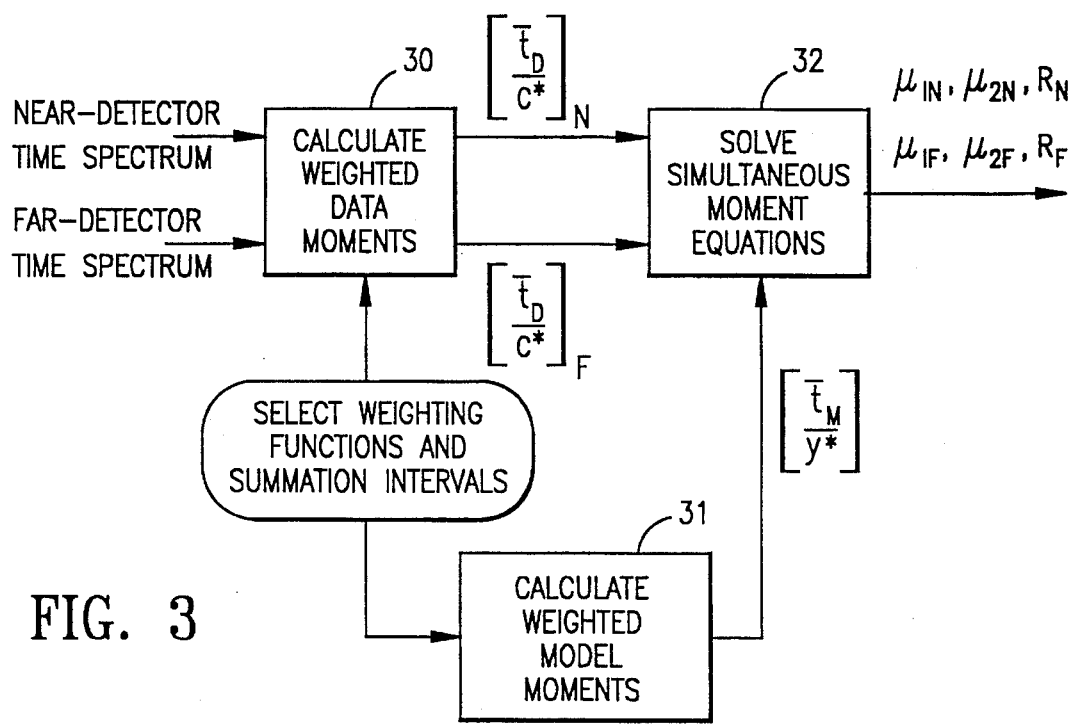
FIGS. 3–8 illustrate the uphole processor and recorder of FIG. 1 utilized in the present invention to produce a borehole log of intrinsic formation properties from the measured die-away curve of FIG. 2.

The process described above is illustrated schematically in FIGS. 3 and 4. Time spectra, consisting of the sets $C_n$ for the near and far detectors, are input to a unit 30 which divides the $C_n$'s by $C_1$ to produce the sets $C_n^*$ and then calculates three values for each of the weighted data moments:

$$\left[ \frac{\bar{i}_D}{\bar{C}^*} \right]_N \text{ and} \qquad (37)$$

$$\left[ \frac{\bar{i}_D}{\bar{C}^*} \right]_F \qquad (38)$$

using weighting functions and summation intervals which have been preselected. This information is also input to a unit 31 which calculates weighted model moments based on the assumed model. The model used in FIG. 3 is as follows:

$$Y_n^* = \frac{e^{-\mu_1(n-1)} + R e^{-\mu_2(n-1)}}{1 + R} \qquad (39)$$

The output of the model moments unit is a set of mathematical expressions for the quantities $$\left[ \frac{\bar{i}_M}{\bar{Y}^*} \right], \qquad (40)$$

of which there are three for the model being used in this example. The mathematical expressions and the data moments are input to a unit 32 which simultaneously solves the two sets of three equations shown below:

$$\left[ \frac{\bar{i}_D}{\bar{C}^*} \right]_{N,k} = \left[ \frac{\bar{i}_M}{\bar{Y}^*} \right]_k ; k = 1, 2, 3 \qquad (41)$$

$$\left[ \frac{\bar{i}_D}{\bar{C}^*} \right]_{F,k} = \left[ \frac{\bar{i}_M}{\bar{Y}^*} \right]_k ; k = 1, 2, 3 \qquad (42)$$

The subscript k has been included to emphasize that a set of three weighting functions and summation intervals is used.

The step of calculating the mathematical expressions for $$\left[ \frac{\bar{i}_M}{\bar{Y}^*} \right] \qquad (43)$$

does not have to be carried out for each incremental data set, provided the model is not changed. These expressions can be part of the information preselected, along with the weighting functions and summation intervals, prior to the well being logged.

Figure 4:
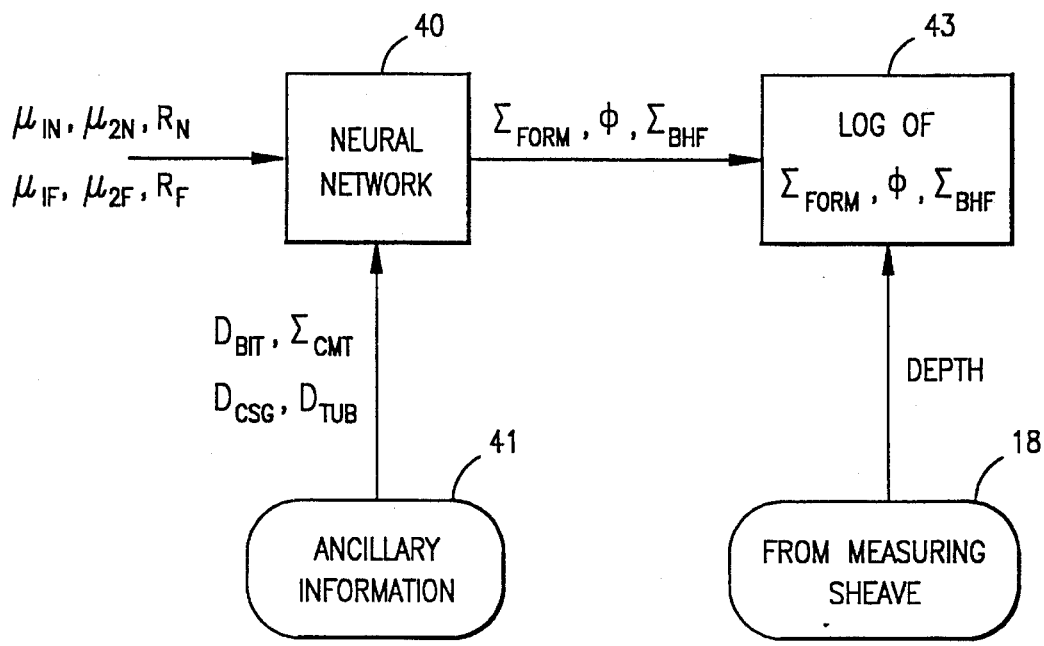

The output of the equation solver unit 32 is the set of model parameters for the near and far detectors: $\mu_{1N}$, $\mu_{2N}$, $R_N$, $\mu_{1F}$, $\mu_{2F}$, and $R_F$. As shown in FIG. 4, values of these parameters are fed into a neural network 40 along with the ancillary information 41. The network has been trained to produce the intrinsic (i.e., correct) values of the formation macroscopic thermal neutron absorption cross section ($\Sigma_{FORM}$), formation porosity ($\phi$), and borehole fluid cross section ($\Sigma_{BHF}$). These values are then used with a depth measurement from a measuring sheave 18 to record a log 43 of the intrinsic properties so determined.

The nature of the ancillary information indicated in FIG. 4 includes the bit size ($D_{BIT}$), cement absorption cross section ($\Sigma_{CMT}$), casing outer diameter ($D_{CSG}$), and tubing outer diameter ($D_{TUB}$). In general, this information characterizes each set of training data used to train the neural network.

The process of training the neural network 40 is formally the same as that described in U.S. Pat. No. 5,345,077 to Allen et al. and U.S. Pat. No. 5,300,770 to Allen and Mills. For a given set of borehole conditions represented by the ancillary information, training data are obtained in media of known values of $\Sigma_{FORM}$, $\phi$, and $\Sigma_{BHF}$. These data consist of time spectra from the near and far detectors in the known media. The data may be obtained by operating the logging tool in suitable calibration models; in wells where the ancillary conditions and the values of $\Sigma_{FORM}$, $\phi$, and $\Sigma_{BHF}$ are accurately known; or a combination of such types of information. The training data may also include the results of theoretical calculations of time-dependent detector responses from a mathematical model (e.g., Monte Carlo simulation) whose validity and accuracy have been established.

The time spectra from a training data set are input to the system of FIGS. 3 and 4, and the output of the neural network 40 is required to be the correct values of $\Sigma_{FORM}$, $\phi$, and $\Sigma_{BHF}$ for those spectra. This step is repeated until all spectra for the given set of ancillary conditions are processed. Upon completion, the vales of the adjustable settings (biases and weights) to which the neural network 40 has converged in producing the correct output values of $\Sigma_{FORM}$, $\phi$, and $\Sigma_{BHF}$ for given input spectra are noted. This entire process is repeated for each set of ancillary conditions for which training data are available.

In field operations, known or assumed values of the ancillary information are used and the network settings are preset to correspond to those values obtained at the end of the training process. It is in this sense that ancillary information is applied to the neural network 40. As logging data are obtained, the system of FIGS. 3 and 4 process them to produce correct values of $\Sigma_{FORM}$, $\phi$, and $\Sigma_{BHF}$.

Figure 5:
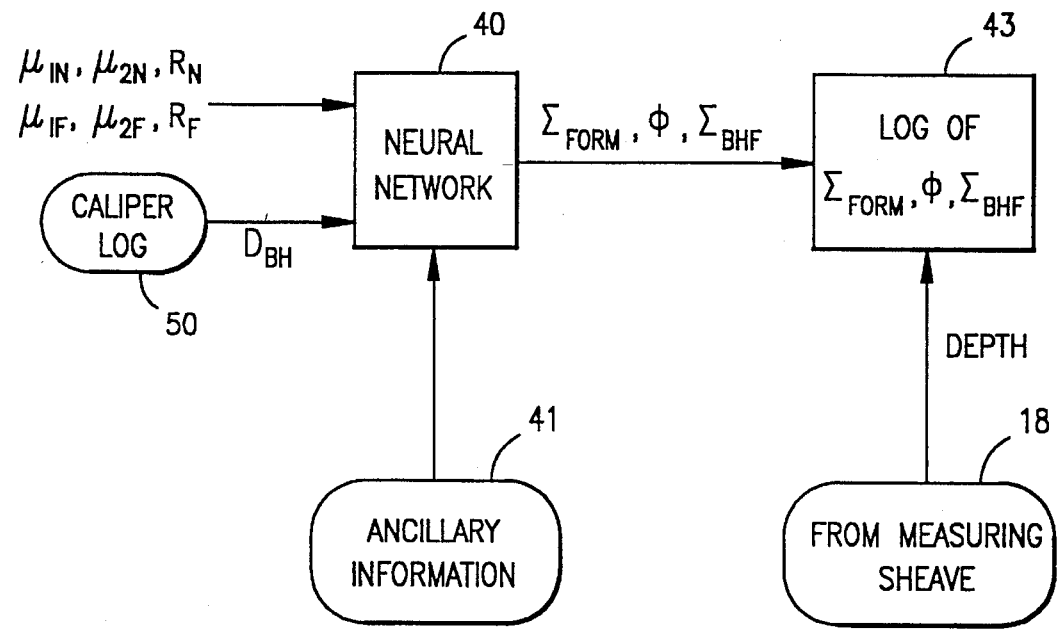

The approach described above is applicable if all the necessary ancillary information is available, either as represented by the training data, or as known or assumed in the field. It may happen that this is not the case. For example, the borehole diameter, $D_{BH}$, may differ from the bit size, $D_{BIT}$, due to hole enlargements. It is well known that washouts frequently occur in drilling and result in $D_{BH}$ being larger than the bit size. To accommodate this situation, one approach is to use a caliper log as an additional input to the neural network 40. This is illustrated in FIG. 5. The value of $D_{BH}$ from the caliper log 50 is a quantity whose value may change continuously with depth. In this case, the other ancillary information may or may not include the bit size. Training of the system shown in FIG. 5 must include data obtained from a sufficient number of representative borehole diameters.

Figure 6:
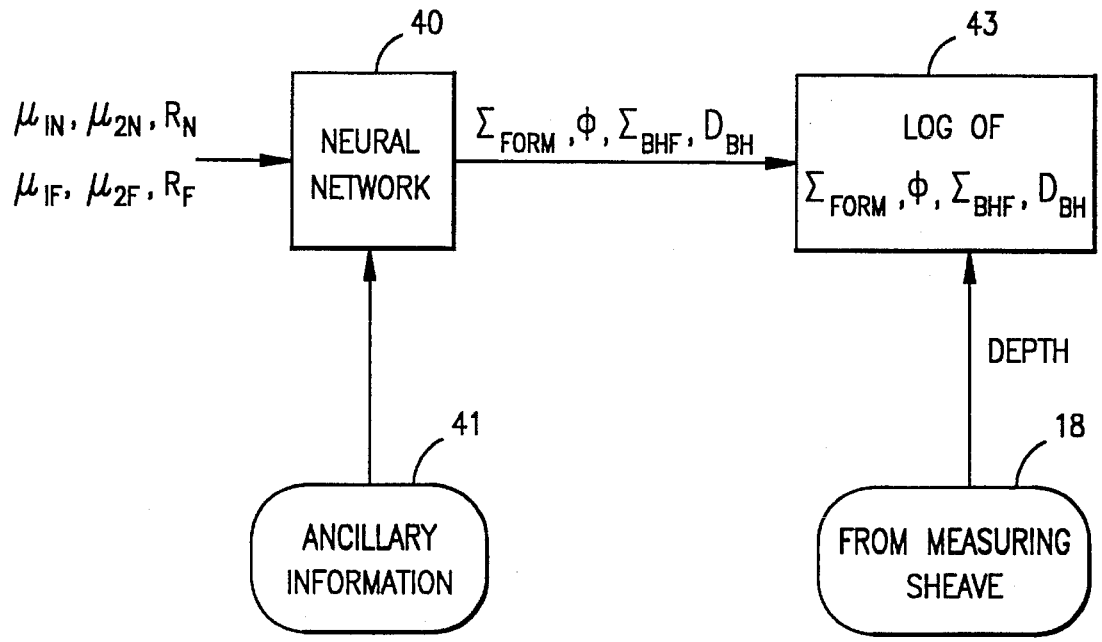
Figure 7:
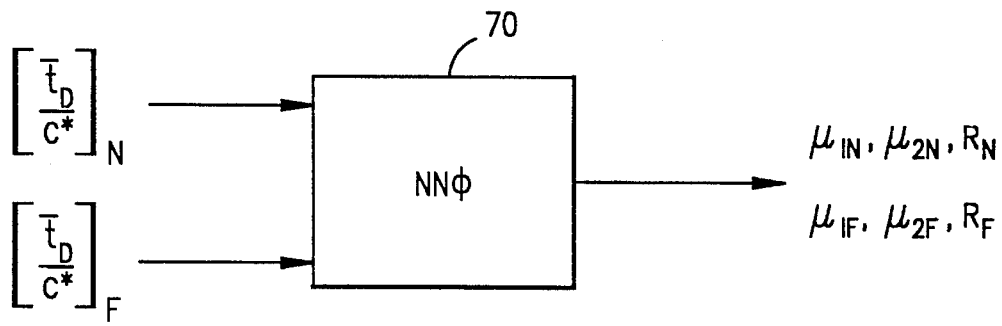

An alternative approach to that described above is to have the neural network estimate borehole diameter from the time spectra. This is illustrated in FIG. 6. The network is trained by including known values of $D_{BH}$ in the output. As with FIG. 5, the training data must include a sufficient number of representative values of borehole diameters. Borehole enlargements of various shapes may also be required in the training data to achieve good results.

In the foregoing description regarding the use of a neural network to obtain values of intrinsic formation parameters (e.g., $\Sigma_{FORM}$, $\phi$, $\Sigma_{BHF}$) from values of model parameters ($\mu_{1N}$, $\mu_{2N}$, $R_N$, $\mu_{1F}$, $\mu_{2F}$, $R_F$) determined from a set of time spectra, it is not necessary to make any assumptions about the functional relationships among the model and formation parameters. In effect, the neural network implicitly determines such relationships based on the training data provided to it. Also, due to a mathematical property of neural networks they provide very accurate means of relating the input (model parameters) to the output (formation parameters). In the past, relationships had to be assumed in the form of graphs, charts, or explicit mathematical expressions. Calibration data plotted in graphs or charts are typically approximated by some convenient fitting curves for use in automated data processing. A recent example of the use of graphs is shown in the article, "Obtaining Intrinsic Formation Capture Cross Sections with Pulsed Neutron Capture Logging Tools," by H. D. Smith, Jr., D. F. Wyatt, Jr., and D. M. Arnold, published in the *The Log Analyst*, Vol. 30, No. 3, pp. 178–194 (1989). An example of the use of explicit mathematical expressions is shown in the article, "Dual-Burst Thermal Decay Time Data Processing and Examples", by J-R. Olesen, M. Mahdavi, and D. K. Steinman, published in the Transactions of the SPWLA 28th Annual Logging Symposium, Paper U, June 29–Jul. 2, 1987.

EXAMPLE OF WEIGHTED-MOMENTS METHOD

A specific example of the application of the weighted-moments method to data of the type shown in FIG. 2 and modeled by a sum of two exponentials will now be described. Contiguous and equal-length time channels will be assumed. The normalized data and model will be used:

$$C_n^* = C_n/C_I \quad (44)$$

$$Y_n^* = \frac{e^{-\mu_1(n-1)} + Re^{-\mu_2(n-1)}}{1+R} \quad (45)$$

$$t_n = (n-1)\Delta t, \quad (46)$$

where n=1, N.

The following moments, weighting functions, and summation intervals will be used:

i). Time moment; $w_{1n}=e^{-\alpha(n-1)}$; $l_1=1$, $u_1=N$ ii). Time moment; $w_{2n}=1$; $l_2=1$, $u_2=N$ iii). Intensity moment; $w_{3n}=1$; $l_3=1$, $u_3=N$ The parameter $\alpha$ is arbitrary. A convenient choice for it might be a value approximating $\mu_1$, which is obtained from the first few channels of the data. An alternative choice would be a fixed value selected by trial and error or based on calibration data. It is not to be implied that the above choices for the moments, weighting functions, or summation intervals are optimum in any sense; rather, they are used for illustrative purposes.

It is convenient to scale the two time moments by $\Delta t$, the channel length. Thus, the following data moments and model moments are needed:

$$\overline{(t_D/\Delta t)}_1, \overline{(t_D/\Delta t)}_2, \overline{C_3}^*,$$

$$\overline{(t_M/\Delta t)}_1, \overline{(t_M/\Delta t)}_2, \overline{Y_3}^*,$$

Since $t_n/\Delta t=n-1$, the time moments can be denoted by:

$$\overline{(n_{D-1})}_1, \overline{(n_{D-1})}_2,$$

$$\overline{(n_{M-1})}_1, \overline{(n_{M-1})}_2,$$

which are actually channel-number moments.

From the definition of the data moments the following expressions apply:

$$\overline{(n_D-1)}_1 = \frac{\sum_{n=1}^{N}(n-1)e^{-\alpha(n-1)}C_n^*}{\sum_{n=1}^{N}e^{-\alpha(n-1)}C_n^*} \quad (47)$$

$$\overline{(n_D-1)}_2 = \frac{\sum_{n=1}^{N}(n-1)C_n^*}{\sum_{n=1}^{N}C_n^*} \quad (48)$$

$$\overline{C_3}^* = \frac{\sum_{n=1}^{N}C_n^*}{\sum_{n=1}^{N}1} = \frac{1}{N}\sum_{n=1}^{N}C_n^* \quad (49)$$

These weighted moments depend on the data and the expressions for them cannot be written in any simpler form. They can only be determined from a given data set and a choice of $\alpha$.

The expressions for the model moments are as follows:

$$\overline{(n_M-1)}_1 = \frac{\sum_{n=1}^{N}(n-1)e^{-\alpha(n-1)}Y_n^*}{\sum_{n=1}^{N}e^{-\alpha(n-1)}Y_n^*} \quad (50)$$

$$\overline{(n_M-1)_2} = \frac{\sum\limits_{n=1}^{N} (n-1)Y_n^*}{\sum\limits_{n=1}^{N} Y_n^*} \quad (51)$$

$$\overline{Y^*}_3 = \frac{\sum\limits_{n=1}^{N} Y_n^*}{\sum\limits_{n=1}^{N} 1} = \frac{1}{N} \sum\limits_{n=1}^{N} Y_n^* \quad (52)$$

It is possible to obtain explicit expressions for the model moments because they involve sums of geometric series or derivatives thereof. For convenience of notation the following is defined.

$$P(x) = \sum\limits_{n=1}^{N} e^{-x(n-1)} = \sum\limits_{l=0}^{N-1} e^{-xl} = \frac{1-e^{-xN}}{1-e^{-x}} \quad (53)$$

$$Q(x) = \sum\limits_{n=1}^{N} (n-1)e^{-x(n-1)} = \sum\limits_{l=0}^{N-1} le^{-xl} \quad (54)$$

$$= \frac{e^{-x} - Ne^{-xN} + (N-1)e^{-x(N+1)}}{(1-e^{-x})^2} \quad (55)$$

The last result is obtained from the fact that:

$$Q(x) = -\frac{dP(x)}{dx} \quad (56)$$

It is straightforward to show algebraically that the model moments may be written in terms of the functions $P(x)$ and $Q(x)$ as follows:

$$\overline{(n_M-1)_1} = \frac{Q(\alpha+\mu_1) + RQ(\alpha+\mu_2)}{P(\alpha+\mu_1) + RP(\alpha+\mu_2)}, \quad (57)$$

$$\overline{(n_M-1)_2} = \frac{Q(\mu_1) + RQ(\mu_2)}{P(\mu_1) + RP(\mu_2)}, \quad (58)$$

$$\overline{Y_3^*} = \frac{P(\mu_1) + RP(\mu_2)}{N(1+R)}. \quad (59)$$

For purposes of symmetry it is convenient to define the following data-dependent quantities:

$$PC^*(x) = \sum\limits_{n=1}^{N} e^{-x(n-1)} C_n^* = \sum\limits_{l=0}^{N-1} e^{-xl} C_{l+1}^* \quad (60)$$

$$QC^*(x) = \sum\limits_{n=1}^{N} (n-1)e^{-x(n-1)} C_n^* = \sum\limits_{l=0}^{N-1} le^{-xl} C_{l+1}^* \quad (61)$$

The data moments can be written in terms of the above quantities as follows:

$$\overline{(n_D-1)_1} = \frac{QC^*(\alpha)}{PC^*(\alpha)}, \quad (62)$$

$$\overline{(n_D-1)_2} = \frac{QC^*(0)}{PC^*(0)}, \quad (63)$$

$$\overline{C_3^*} = \frac{PC^*(0)}{N}. \quad (64)$$

Now corresponding data and model moments are equated to produce three simultaneous equations to be solved for $\mu_1$, $\mu_2$, and $R$:

$$\frac{Q(\alpha+\mu_1) + RQ(\alpha+\mu_2)}{P(\alpha+\mu_1) + RP(\alpha+\mu_2)} = \frac{QC^*(\alpha)}{PC^*(\alpha)}, \quad (65)$$

$$\frac{Q(\mu_1) + RQ(\mu_2)}{P(\mu_1) + RP(\mu_2)} = \frac{QC^*(0)}{PC^*(0)}, \quad (66)$$

$$\frac{P(\mu_1) + RP(\mu_2)}{1+R} = PC^*(0). \quad (67)$$

Since R appears only as a linear factor in the above equations, one equation can be used to solve for R and that expression substituted in the remaining two equations. For example, from the last equation:

$$R = \frac{PC^*(0) - P(\mu_1)}{PC^*(0) - P(\mu_2)} \quad (68)$$

When this expression is substituted into the first and second equations the result is a pair of nonlinear equations to be solved simultaneously for $\mu_1$, and $\mu_2$. These equations may be written symbolically as follows:

$$F(\mu_1, \mu_2) = 0 \quad (69)$$

$$G(\mu_1, \mu_2) = 0 \quad (70)$$

The solution to these equations can be obtained by generalizing the bisection method used to find a root of a single nonlinear equation (e.g. see *Numerical Recipes*, second edition, pgs. 343–374). The values of $\mu_1$ and $\mu_2$ so obtained by this or any other method can be substituted in the foregoing equation for R to determine its value.

The process described above is carried out by numerical computations performed in the steps in FIG. 3 shown as "calculate weighted data moments", "calculate weighted model moments", and "solve simultaneous moment equations". It is done independently for data from both the near and far detectors, resulting in the quantities $\mu_{1N}$, $\mu_{2N}$, $R_N$, $\mu_{1F}$, $\mu_{2F}$, and $R_F$ which are applied to the neural network.

In practice a problem can arise when the decay constants $\mu_1$ and $\mu_2$ for either detector are sufficiently close together that use of the two-exponential model does not result in accurate values of these parameters being obtained. This may happen in pulsed neutron capture logging wherein the borehole is filled with fresh water, oil, or air. The present invention is an improvement over prior art by comparing the quantity $|(\mu_1-\mu_2)/(\mu_1+\mu_2)|$ to a predetermined small number $\epsilon$, such that when $|(\mu_1-\mu_2)/(\mu_1+\mu_2)| < \epsilon$, final values of $\mu_1$ and $\mu_2$ are obtained by a different process which is described below.

If $|(\mu_1-\mu_2)/(\mu_1+\mu_2)| < \epsilon$, a modified form of the two-exponential model is used. Recalling that the normalized model is:

$$Y_n^* = \frac{e^{-\mu_1(n-1)} + Re^{-\mu_2(n-1)}}{1+R} \quad (71)$$

This can be written as:

$$Y_n^* = e^{-\mu_1(n-1)} \left( \frac{1 + Re^{-(\mu_2-\mu_1)(n-1)}}{1+R} \right) \quad (72)$$

Defining $\Delta\mu = \mu_2 - \mu_1$, then $$Y_n^* = e^{-\mu_1(n-1)} \left( \frac{1 + Re^{-\Delta\mu(n-1)}}{1+R} \right) \quad (73)$$

The second exponential term can be expanded to give $$Y_n^* = e^{-\mu_1(n-1)} \left( \frac{1 + R\{1 - \Delta\mu(n-1) + 1/2\,[\Delta\mu(n-1)]^2 - \ldots\}}{1+R} \right), \quad (74)$$

$$= e^{-\mu_1(n1)} \left( 1 - \frac{R\Delta\mu(n-1)}{1+R} [1 - 1/2\,\Delta\mu(n-1) + \ldots] \right) \quad (75)$$

Since $\epsilon$ is small, $\Delta\mu$ will be small and the above expression can be approximated by setting the term in square brackets to unity:

$$Y_n^* \approx e^{-\mu_1(n-1)} \left( 1 - \frac{R\Delta\mu(n-1)}{1+R} \right) \quad (76)$$

The above expression for $Y_n^*$ is used in calculating all model moments. The model parameters for a given detector are $\mu_1$, $\Delta\mu$, and R. This is called the "near single-exponential" model. The actual value of $\epsilon$ to be used is determined by trial and error using representative data.

It may be happen that even the foregoing approach fails if the decay data are sufficiently close to being a single exponential. This would be the case if $|(\mu_1-\mu_2)/(\mu_1+\mu_2)|<\eta<<\epsilon$. $\eta$ is a predetermined constant which represents the threshold between single-exponential and two-exponential representations. If $|(\mu_1-\mu_2)/(\mu_1+\mu_2)|<\eta$, then the model to be used is a single exponential:

$$Y_n^* = e^{-\mu(n-1)} \tag{77}$$

Since a single decay constant, $\mu$, is to be determined, only one moment is needed. The actual value of $\eta$ is to be determined by trial and error.

To summarize the model representations:

$$Y_n^* = \frac{e^{-\mu_1(n-1)} + Re^{-\mu_2(n-1)}}{1+R} \tag{78}$$

if $|(\mu_1-\mu_2)/(\mu_1+\mu_2)| \geq \epsilon$, $$Y_n^* = e^{-\mu_1(n-1)}\left(1 - \frac{R\Delta\mu(n-1)}{1+R}\right) \tag{79}$$

if $\eta \leq |(\mu_1-\mu_2)/(\mu_1+\mu_2)| < \epsilon$ $$Y_n^* = e^{-\mu(n-1)} \tag{80}$$

if $|(\mu_1-\mu_2)/(\mu_1+\mu_2)| < \eta$

FIGS. 3, 4, 5, and 6 must be suitably modified to accomplish the branching indicated above.

The step shown in FIG. 3 of solving the simultaneous set of moment equations for each incremental data set (incremented on time or depth) can be carried out with the aid of an additional neural network. For a given set of arrangement with a trained neural network 70. Training of neural network 70 is done as follows. For a given set of ancillary conditions, calibration data are obtained. Three weighting functions and three associated summation intervals are selected as described previously. The appropriate data moments $$\begin{bmatrix} \bar{i}_D \\ \bar{C}^* \end{bmatrix}_{N,k} \text{ and } \begin{bmatrix} \bar{i}_D \\ \bar{C}^* \end{bmatrix}_{F,k} \tag{81}$$

are calculated. The corresponding model moments $$\begin{bmatrix} \bar{i}_M \\ \bar{Y}^* \end{bmatrix}_k \tag{82}$$

are calculated as analytic expressions. Corresponding data and model moments are equated and the requesting equations are solved simultaneously by a suitable numerical procedure. This provides values of $\mu_{1N}, \mu_{2N}, R_N, \mu_{1F}, \mu_{2F}, R_F$ (for the case of the two-exponential model). Neural network 70 is trained by inputting the calibration data moments and requiring the output to be the corresponding values of $\mu_{1N}, \mu_{2N}, R_N, \mu_{1F}, \mu_{2F}$, and $R_F$ obtained numerically. The advantage of training neural network 70 in this way is that the two-exponential model is inherently incorporated into the process. The obvious motivation for using a neural network in this manner is speed of data processing. The trained neural network gives almost instantaneous results, whereas solving the transcendental equations is strongly dependent on the processor speed and the algorithm used to solve the equations.

In logging operations, data moments are obtained for an accumulated set of data and are input to the previously trained neural network 70. The output will be values of $\mu_{1N}, \mu_{2N}, R_N, \mu_{1F}, \mu_{2F}$ and $R_F$ corresponding to the input data set. These quantities are then further treated as shown in FIG. 4 to ultimately produce values of $\Sigma_{FORM}$, $\phi$, and $\Sigma_{BHF}$. If the quantities $|(\mu_{1N}-\mu_{2N})/(\mu_{1N}+\mu_{2N})|$ or $|(\mu_{1F}-\mu_{2F})/(\mu_{1F}+\mu_{2F})|$ are smaller than some preselected number $\epsilon$, a procedure similar to that described previously can be used in conjunction with neural network 70.

Figure 8:
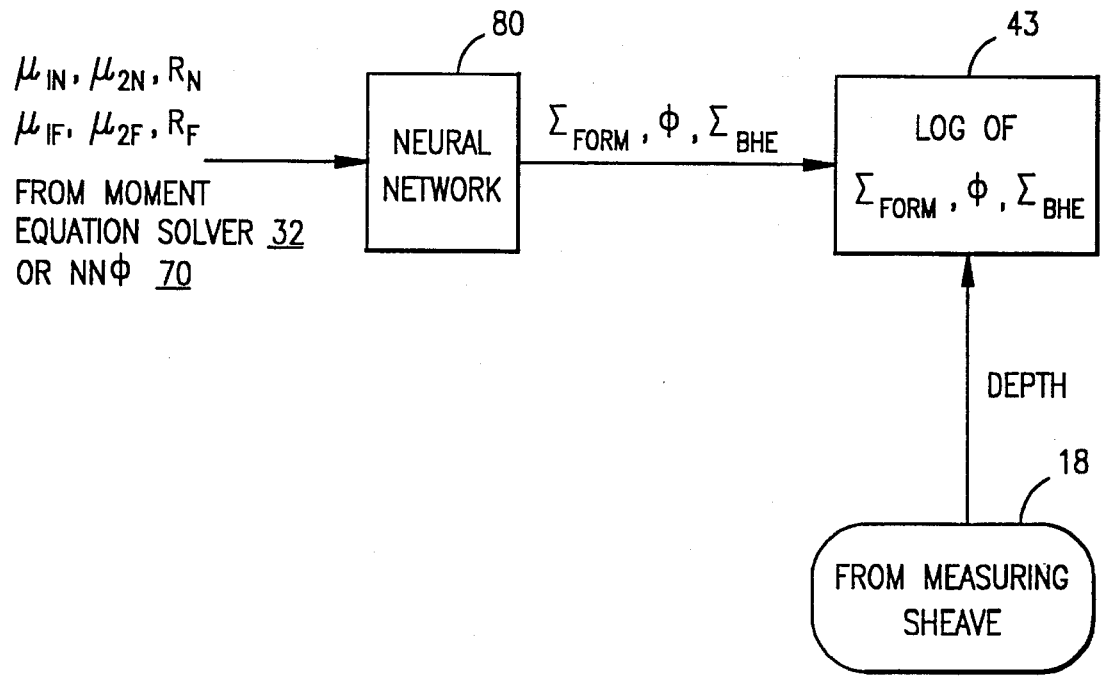

The situation may arise when a sufficient amount of ancillary information is not available, either as represented by the calibration data or knowledge of the well in the field, to allow the procedure shown in FIGS. 3 and 4 to be carried out. An alternative approach is to define an effective macroscopic absorption cross section for the borehole region, which is a means of combining the properties of that region into a single parameter. There are many ways to define such a parameter, a simple one of which is to volume-average the cross sections of the borehole materials. A quantity $\Sigma_{BHE}$ is defined as:

$$\Sigma_{BHE} = \frac{1}{V_{BH}}(\Sigma_{BHF}V_{BHF} + \Sigma_{TUB}V_{TUB} + \Sigma_{CSG}V_{CSG} + \Sigma_{CMT}V_{CMT}) \tag{83}$$

where the indicated volumes are on a per unit-length basis. FIG. 8 shows the neural network arrangement 80 for this situation. Training consists of inputting values of the model parameters obtained from calibration data derived from either the moment equation solver 32 or trained neural network 70. The output of the neural network 80 is the correct values of $\Sigma_{FORM}$, $\phi$, and $\Sigma_{BHE}$, the last quantity having been calculated from the equation give above. Operation of the system under logging conditions would proceed in the manner described previously.

An alternative to simple volume averaging to get an effective borehole cross section would be to include the average thermal neutron flux in each region as a factor. Thus, $\Sigma_{BHE}$ is defined as follows:

$$\Sigma_{BHE} = \frac{1}{\bar{\phi}_{BH}V_{BH}}(\Sigma_{BHF}\bar{\phi}_{BHF}V_{BHF} + \Sigma_{TUB}\bar{\phi}_{TUB}V_{TUB} + \Sigma_{CSG}\bar{\phi}_{CSG}V_{CSG} + \Sigma_{CMT}\bar{\phi}_{CMT}V_{CMT}) \tag{84}$$

In general, the flux averages ($\bar{\phi}_{BH}$, $\bar{\phi}_{BHF}\bar{\phi}_{TUB}\bar{\phi}_{CSG}$, and $\bar{\phi}_{CMT}$) needed in the above expression would be obtained from theoretical calculations based on a suitable mathematical model.

While the foregoing has been described in terms of a generalized dual-detector system, any of several well known types of secondary radiation detection systems may be employed. A preferred embodiment would be a dual-detector pulsed neutron capture system employing gamma-ray detectors with the subsequent determination of $\Sigma_{FORM}$, $\phi$, and $\Sigma_{BHF}$. An alternative embodiment would be a dual-detector pulsed neutron capture system employing gamma-ray detectors with the subsequent determination of $\Sigma_{FORM}$, $\phi$, and $\Sigma_{BHE}$. Other embodiments would employ a pair of thermal neutron detectors with the subsequent determination of $\Sigma_{FORM}$, $\phi$, and $\Sigma_{BHF}$ or a pair of thermal neutron detectors with the subsequent determination of $\Sigma_{FORM}$, $\phi$, and $\Sigma_{BHE}$.

We claim:

1. A method for converting signals representing the die-away of nuclear radiation in a subsurface formation surrounding a borehole into a log of certain intrinsic formation properties versus depth within the formation, comprising the steps of:

a) lowering a logging tool having a pulsed source of fast neutrons and first and second spaced-apart secondary radiation detectors into a borehole traversing a subsurface formation whose intrinsic properties are to be determined, b) irradiating said subsurface formation at an initial depth position within said borehole with fast neutrons from said neutron source, c) recording intensity signals with said first and second spaced-apart secondary radiation detectors representing the die-away of nuclear radiation after said fast neutrons from said neutron source have passed through and been moderated by said subsurface formation, d) generating a model of the die-away of nuclear radiation in a subsurface formation, such model consisting of exponentially varying terms containing amplitudes and decay constants responding to borehole and formation effects, e) producing weighted moments of said model and of said intensity signals from said first and second detectors, f) equating said weighted model moments with said weighted intensity moments for each of said first and second detectors, g) solving simultaneously said equated weighted model moments and weighted intensity moments to obtain values for a borehole decay constant, a formation decay constant and a formation-to-borehole amplitude ratio for each of said first and second detectors, h) producing intrinsic values of a formation macroscopic thermal neutron absorption cross section, a formation porosity and a borehole fluid cross section from said borehole decay constant, said formation decay constant and said formation-to-borehole amplitude ratio for each of said first and second detectors using a trained neural network, i) traversing said logging tool along said borehole from said initial depth position, j) repeating steps b) to h) as said logging tool traverses along said borehole and k) generating a log of said intrinsic values of said formation macroscopic thermal neutron absorption cross section, said formation porosity and said borehole fluid cross section versus depth within said subsurface formation.

2. The method of claim 1 wherein said neural network is trained with data characterizing drill bit size, $D_{BIT}$, cement absorption cross section, $\Sigma_{CMT}$, casing outer diameter, $D_{CSG}$, and tubing outer diameter, $D_{TUB}$.

3. The method of claim 1 wherein said neural network is trained with data characterizing borehole diameter $D_{BH}$, cement absorption cross section, $\Sigma_{CMT}$, casing outer diameter, $D_{CSG}$, and tubing outer diameter, $D_{TUB}$.

4. The method of claim 1 wherein step (g) of solving simultaneously said equated model moments and weighted intensity moments is carried out using a trained neural network.

5. A method for converting signals representing the die-away of nuclear radiation in a subsurface formation surrounding a borehole into a log of certain intrinsic formation properties versus depth within the formation, comprising the steps of:

a) lowering a logging tool having a pulsed source of fast neutrons, a near-spaced secondary radiation detector and a far-spaced secondary radiation detector into a borehole traversing a subsurface formation whose said intrinsic properties are to be determined, b) irradiating said subsurface formation at an initial depth position within said borehole with fast neutrons from said neutron source, c) recording intensity signals representing the die-away of nuclear radiation after said near-spaced and far-spaced secondary radiation detectors after said fast neutrons from said neutron source have passed through and been moderated by said subsurface formation, d) generating a model of the die-away of nuclear radiation in a subsurface formation having exponentially varying terms containing amplitudes and decay constants responding to borehole and formation effects as follows:

$$Y_n^* = \frac{e^{-\mu_1(n-1)} + Re^{-\mu_2(n-1)}}{1+R}$$

where $Y_n^*$ = normalized model $\mu_1$ = borehole decay constant $\mu_2$ = formation decay constant R = formation-to-borehole amplitude ratio e) determining weighted moments of said intensity signals from said near-spaced and far-spaced detectors as follows:

$$\begin{bmatrix} \bar{t}_D \\ \bar{C} \end{bmatrix}_k = \sum_{n=l_k}^{u_k} W_{kn} \begin{bmatrix} t_n \\ 1 \end{bmatrix} C_n / \sum_{n=l_k}^{u_k} W_{kn} \begin{bmatrix} C_n \\ 1 \end{bmatrix};$$

$k = 1, 2M$ where $\bar{t}_D$ = weighted time moment of data, $\bar{C}$ = weighted intensity moment of data, 2M is the number of weighting functions as denoted by the following set: ($w_{kn}$; k=1, 2M; n=1,N), and the number of summation intervals as denoted by the following set: ($l_k, u_k$; k=1, 2M), N = number of discrete time channels, $C_n$ = accumulated counts in channel n for n=1 through N channels, f) determining the weighted moments of said model as follows:

$$\begin{bmatrix} \bar{t}_M \\ \bar{Y} \end{bmatrix}_k = \sum_{n=l_k}^{u_k} W_{kn} \begin{bmatrix} t_n \\ 1 \end{bmatrix} Y_n / \sum_{n=l_k}^{u_k} W_{kn} \begin{bmatrix} Y_n \\ 1 \end{bmatrix};$$

$k = 1, 2M$ where $t_M$ = weighted time moment of model,

Y = weighted intensity moment of model, g) equating said weighted intensity moments with said weighted model moments for each of said near-spaced and far-spaced detectors as follows:

$$\begin{bmatrix} \bar{t}_D \\ \bar{C} \end{bmatrix}_k = \begin{bmatrix} \bar{t}_M \\ \bar{Y} \end{bmatrix}_k ; \quad k = 1, 2M$$

h) solving simultaneously said equated weighted model moments and weighted intensity moments for each of said first and second detectors to obtain values for borehole decay constants $\mu_{1N}$ and $\mu_{1F}$, formation decay constants $\mu_{2N}$ and $\mu_{2F}$, and formation-to-borehole amplitude ratios $R_N$ and $R_F$ for each of said near-spaced and far-spaced detectors, where $\mu_{1N}$ = borehole decay constant for said near-spaced detector $\mu_{1F}$=borehole decay constant for said far-spaced detector, $\mu_{2N}$=formation decay constant for said near-spaced detector, $\mu_{2F}$=formation decay constant for said far-spaced detector, $R_N$=formation-to-borehole amplitude ratio for said near-spaced detector, $R_F$=formation-to-borehole amplitude ratio for said far-spaced detector, i) producing intrinsic values of a formation macroscopic thermal neutron absorption cross section, $\Sigma_{FORM}$, a formation porosity, $\phi$, and a borehole fluid cross section, $\Sigma_{BHF}$, from said borehole decay constants, $\mu_{1N}$ and $\mu_{1F}$, said formation decay constants, $\mu_{2N}$ and $\mu_{2F}$, and said formation-to-borehole amplitude ratios for said first and second detectors using a trained neural network, j) traversing said logging tool along said borehole from said initial depth position, and k) repeating steps b) through i) as said logging tool traverses along said borehole, and l) generating a log of said intrinsic values of said formation macroscopic thermal neutron absorption cross section, said formation porosity and said borehole fluid cross section versus depth within said subsurface formation.

6. A method for converting signals representing the die-away of nuclear radiation in a subsurface formation surrounding a borehole into a log of certain intrinsic formation properties versus depth within the formation, comprising the steps of:

a) lowering a logging tool having a pulsed source of fast neutrons and first and second spaced-apart secondary radiation detectors into a borehole traversing a subsurface formation whose intrinsic properties are to be determined, b) irradiating said subsurface formation at an initial depth position within said borehole with fast neutrons from said neutron source, c) recording intensity signals with said first and second spaced-apart secondary radiation detectors representing the die-away of nuclear radiation after said fast neutrons from said neutron source have passed through and been moderated by said subsurface formation, d) generating a model of the die-away of nuclear radiation in a subsurface formation, such model having exponentially varying terms containing amplitudes and decay constants responding to borehole and formation effects, e) producing weighted moments of said model and of said intensity signals from said first and second detectors, f) equating said weighted model moments with said weighted intensity moments for each of said first and second detectors, g) solving simultaneously said equated weighted model moments and weighted intensity moments to obtain values for a borehole decay constant, a formation decay constant and a formation-to-borehole amplitude ratio for each of said first and second detectors, h) producing intrinsic values of a formation macroscopic thermal neutron cross section, a formation porosity and an effective borehole macroscopic absorption cross section from said borehole decay constant, said formation decay constant and said formation-to-borehole amplitude ratio for each of said first and second detectors using a trained neural network, i) traversing said logging tool along said borehole from said initial depth position, j) repeating steps b) to h) as said logging tool traverses along said borehole and k) generating a log of said intrinsic values of said formation macroscopic thermal neutron cross section, said formation porosity and said effective borehole macroscopic absorption cross section versus depth within said subsurface formation.

7. The method of claim 6 wherein said effective borehole macroscopic absorption cross section is determined as follows:

$$\Sigma_{BHE} = \frac{1}{V_{BH}} (\Sigma_{BHF} V_{BHF} + \Sigma_{TUB} V_{TUB} + \Sigma_{CSG} V_{CSG} + \Sigma_{CMT} V_{CMT})$$

where, $\Sigma_{BHE}$=effective borehole macroscopic absorption cross section, $\Sigma_{BHF}$=borehole fluid macroscopic absorption cross section, $\Sigma_{TUB}$=borehole tubing macroscopic absorption cross section, $\Sigma_{CSG}$=borehole casing macroscopic absorption cross section, $\Sigma_{CMT}$=borehole casing macroscopic absorption cross section, $\Sigma_{BH}$=borehole volume on a per-unit-length basis, $\Sigma_{BHF}$=borehole fluid volume on a per-unit-length basis, $\Sigma_{TUB}$=borehole tubing volume on a per-unit-length basis, $\Sigma_{CSG}$=borehole casing volume on a per-unit-length basis and $\Sigma_{CMT}$=borehole cement volume on a per-unit-length basis.

8. The method of claim 6 wherein said effective borehole macroscopic absorption cross section is determined as follows:

$$\Sigma_{BHE} = \frac{1}{\bar{\phi}_{BH} V_{BH}} (\Sigma_{BHF} \bar{\phi}_{BHF} V_{BHF} + \Sigma_{TUB} \bar{\phi}_{TUB} V_{TUB} + \Sigma_{CSG} \bar{\phi}_{CSG} V_{CSG} + \Sigma_{CMT} \bar{\phi}_{CMT} V_{CMT})$$

where, $\Sigma_{BHE}$=effective borehole macroscopic absorption cross section, $\Sigma_{BHF}$=borehole fluid macroscopic absorption cross section, $\Sigma_{TUB}$=borehole tubing macroscopic absorption cross section, $\Sigma_{CSG}$=borehole casing macroscopic absorption cross section, $\Sigma_{CMT}$=borehole casing macroscopic absorption cross section, $\Sigma_{BH}$=borehole volume on a per-unit-length basis, $\Sigma_{BHF}$=borehole fluid volume on a per-unit-length basis, $\Sigma_{TUB}$=borehole tubing volume on a per-unit-length basis, $\Sigma_{CSG}$=borehole casing volume on a per-unit-length basis, $\Sigma_{CMT}$=borehole cement volume on a per-unit-length basis, $\bar{\phi}_{BH}$=borehole flux average, $\bar{\phi}_{BHF}$=borehole fluid flux average, $\bar{\phi}_{TUB}$=borehole tubing flux average, $\bar{\phi}_{CSG}$=borehole casing flux average and $\bar{\phi}_{CMT}$=borehole cement flux average.

\* \* \* \* \*